United States Patent [19]

Solow

[11] Patent Number: 5,469,135
[45] Date of Patent: Nov. 21, 1995

[54] VEHICLE SECURITY DEVICE AND ALARM

[75] Inventor: Joseph E. Solow, Dix Hills, N.Y.

[73] Assignee: WOLO Manufacturing Corporation, Deer Park, N.Y.

[21] Appl. No.: 240,861

[22] Filed: May 10, 1994

[51] Int. Cl.⁶ .................................................. B60R 25/10
[52] U.S. Cl. ..................... 340/426; 340/429; 340/693; 307/10.2; 70/209; 70/226
[58] Field of Search ..................... 340/426, 429, 340/425.5, 546; 70/209, 226, 210–214; 307/10.1, 10.2

[56] References Cited

U.S. PATENT DOCUMENTS 5,163,309  11/1992  Wu ............................................. 70/209
5,258,741  11/1993  Fuller ....................................... 340/426
5,398,017  3/1995  Chen ........................................ 340/426

Primary Examiner—Donnie L. Rosland
Attorney, Agent, or Firm—Brumbaugh, Graves, Donohue & Raymond

[57]  ABSTRACT

A vehicle anti-theft device and alarm includes a U-shaped rod for attachment to a vehicle steering wheel in a position overlying the vehicle dash board. An alarm is positioned in said U-shaped rod, whereby said alarm is firmly secured to a vehicle and inaccessible for tampering.

18 Claims, 3 Drawing Sheets

VEHICLE SECURITY DEVICE AND ALARM

BACKGROUND OF THE INVENTION

The present invention relates to automobile anti theft devices and alarms. In particular the invention relates to an easily installed alarm for an automobile that is tamper resistant.

The assignee of the present invention presently markets an automobile anti-theft device under the trademark ON GUARD, which is described in U.S. Pat. No. 5,163,309. This device is designed to attach to the steering wheel of an automobile and extend over the dash board in close proximity to the dashboard, thereby preventing the wheel from being turned. The position of the device makes its presence easily seen by a would-be car thief, thus discouraging the thief from attempting to steal that particular automobile.

Another commonly used anti-theft device is an alarm system. There are many known auto alarms, which respond to a variety of events, including electrical system transients arising out of activation of interior, trunk or under-hood lights; vibration sensing devices; ultrasonic devices that sense opening of a door; etc. Most known alarm devices require installation and connection to the electrical system of an automobile. Installation and connection are complicated by the requirement that the device be secured to the automobile with sufficient mechanical attachment to prevent the alarm device from being rapidly removed and discarded as a car thief drives away.

A portable alarm unit that requires no installation is presently available and consists of an electronic unit with a connector to be plugged into the outlet of the automobile's cigarette lighter. This unit has not achieved much success, even though it is inexpensive and requires no installation, because it can easily be removed and discarded by a thief.

There have also been proposals to provide tampering alarms as part of mechanical security devices of the type that attach to automobile controls, such as the steering wheel. Such devices do not provide complete protection against vehicle entry, for example to steal the contents or parts of the vehicle, and are susceptible to tampering to disable the alarm because of the availability of the electronic portion.

It is therefore an object of the present invention to provide a combined security device and alarm unit that attaches securely to a vehicle, is tamper resistant and requires no permanent installation.

SUMMARY OF THE INVENTION

In accordance with the invention there is provided an anti-theft and alarm device for an automobile. The device includes a U-shaped rod having two ends connected to parallel lock plates. The lock plates are spaced to receive the steering wheel of a vehicle with the U-shaped rod extending therefrom over the dash board of a vehicle. A lock member is provided and arranged to extend between said two plates in a position corresponding to the inside of the steering wheel, whereby when the lock member is extended, the U-shaped rod is locked to the steering wheel in a position overlying the dash board. A self-contained electronic alarm is mounted within the U-shaped rod and secured thereto, for sensing tampering with the vehicle and for signaling an alarm in response thereto.

In a preferred arrangement the alarm includes a power switch which is inaccessible for operation when the device is mounted on a steering wheel. The power switch may be in the form of a mercury switch which is internal to the alarm, so that the device is powered up when the device is in an installed position and power is off when the device is removed and stored in an inverted position. The alarm preferably includes a battery power supply and a power cord for connection to the power supply of the automobile. The alarm may include features such as a light that flashes when an alarm is sounded, to further disturb and panic an intruder. The light may also provide a car locating function when the alarm is armed and disarmed by a remote control, such that when the owner deactivates the alarm by remote control, the light is illuminated for approximately one minute to assist the owner in finding the auto in a parking lot at night and to also enable the owner to determine if an intruder is lurking in the auto.

For a better understanding of the present invention, together with other and further objects thereof, reference is made to the following description, taken in conjunction with the accompanying drawings, and its scope will be pointed out in the appended claims.

DESCRIPTION OF THE INVENTION

Figure 1:
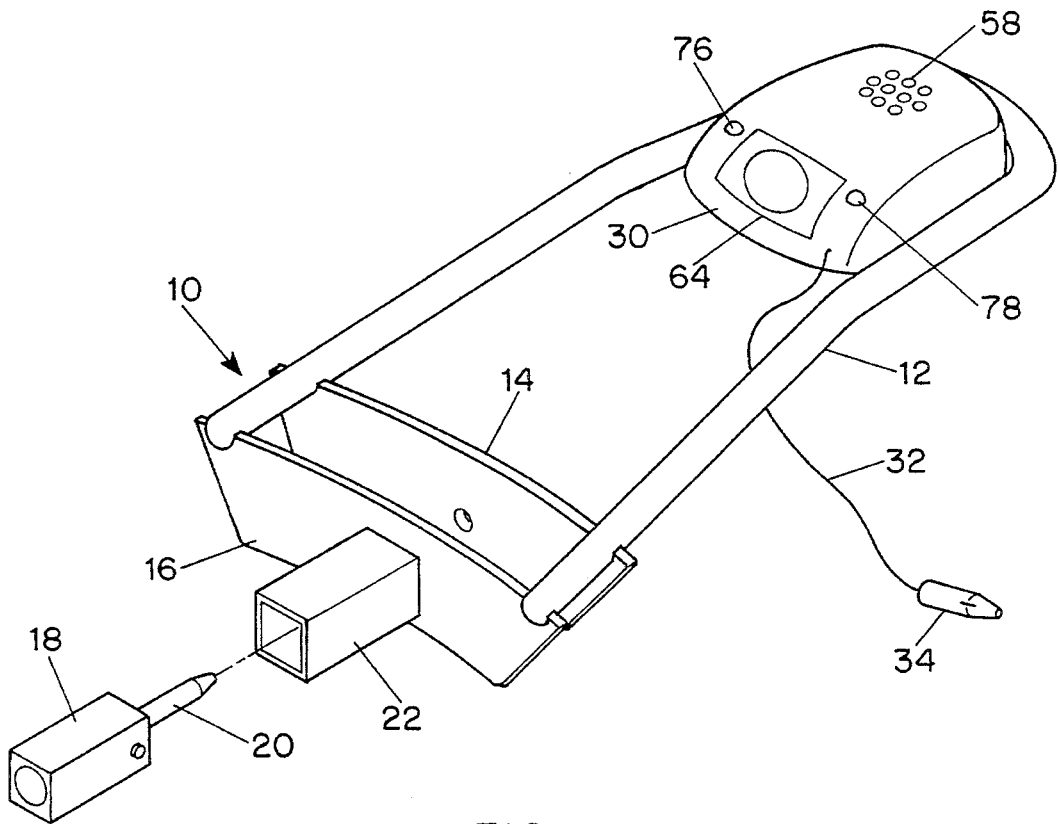
FIG. 1 is a perspective view of a security and alarm device in accordance with a preferred embodiment of the present invention.
Figure 2:
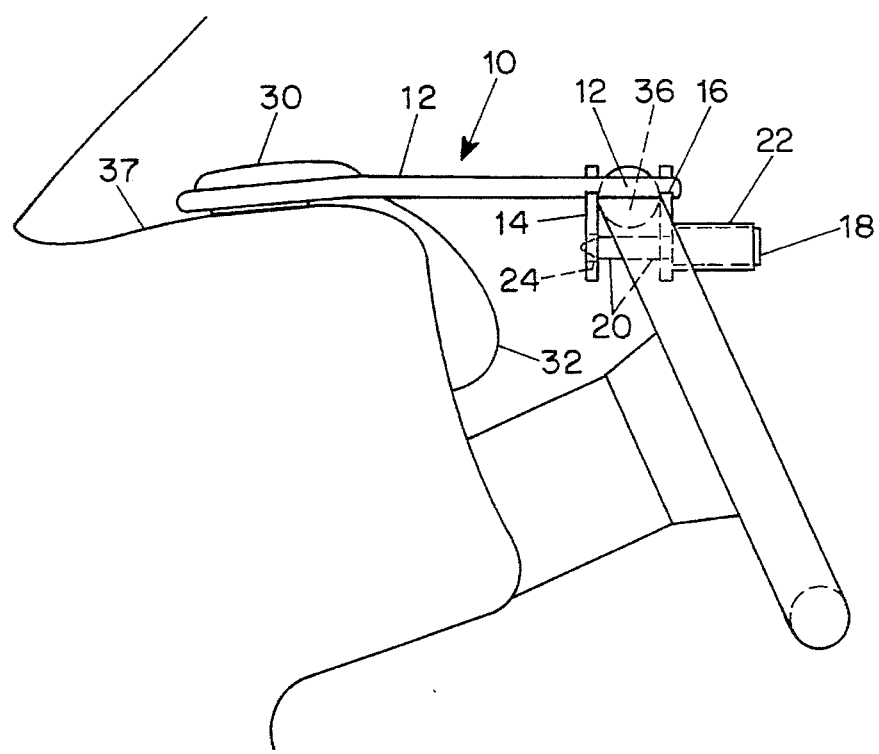
FIG. 2 is a side view of the FIG. 1 device as installed in a vehicle.

FIG. 1 illustrates a security device 10 which has the mechanical configuration as described in U.S. Pat. No. 5,163,309, incorporated by reference herein including a U-shaped rod 12 which is welded to or rigidly attached by its two ends to parallel steel lock plates 14 and 16. As shown in FIG. 2, the parallel steel lock plates 14 and 16 extend generally perpendicular to the plane of the U-shaped rod 12. Plate 16 includes a sleeve 22 into which is mounted a lock mechanism 18, which has a projecting rod 20. As explained in the referenced patent and illustrated in FIG. 2, rod 20 of lock 18 extends in the locked position between plates 14 and 16 to firmly secure device 10 onto the rim 36 of a vehicle steering wheel with the U-shaped member 12 extending over the top of the dashboard 37 of the vehicle.

In addition to the mechanical arrangement according to the referenced patent, the device 10 of the present invention includes an alarm circuit 30 which is mounted within a housing rigidly attached to the U-shaped member. As shown in FIG. 1, the alarm circuit 30 is positioned between the two ends of the U-shaped rod 30, at the bottom of the "U" of the rod 30. The alarm circuit 30 is mounted on a steel plate 28, which is welded to the lower side of the end 26 of U-shaped member 12 and may be attached thereto by rivets mounted into plate 28, U-shaped member 12 or both. Preferably all access to alarm circuit 30, such as case openings 31 for inserting batteries, are located on the lower side of circuit 30, so that they cannot be accessed when the device 10 is mounted in a vehicle. The upper face of circuit 30 includes a high intensity lamp 64 and a sounding device 58, as will be further explained. A power cord 32, including a plug 34 for connection to the cigarette lighter socket of the vehicle, is provided as the main power source for the alarm circuit.

Figure 3:
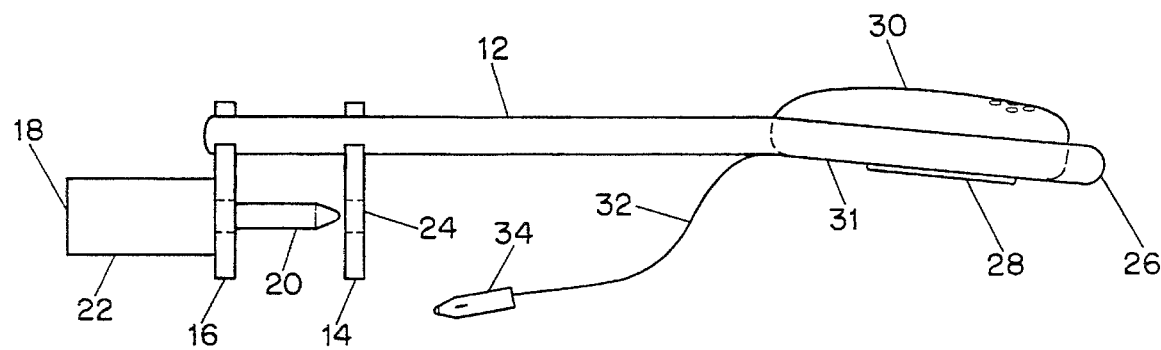
FIG. 3 is a side view of the FIG. 1 device.
Figure 4:
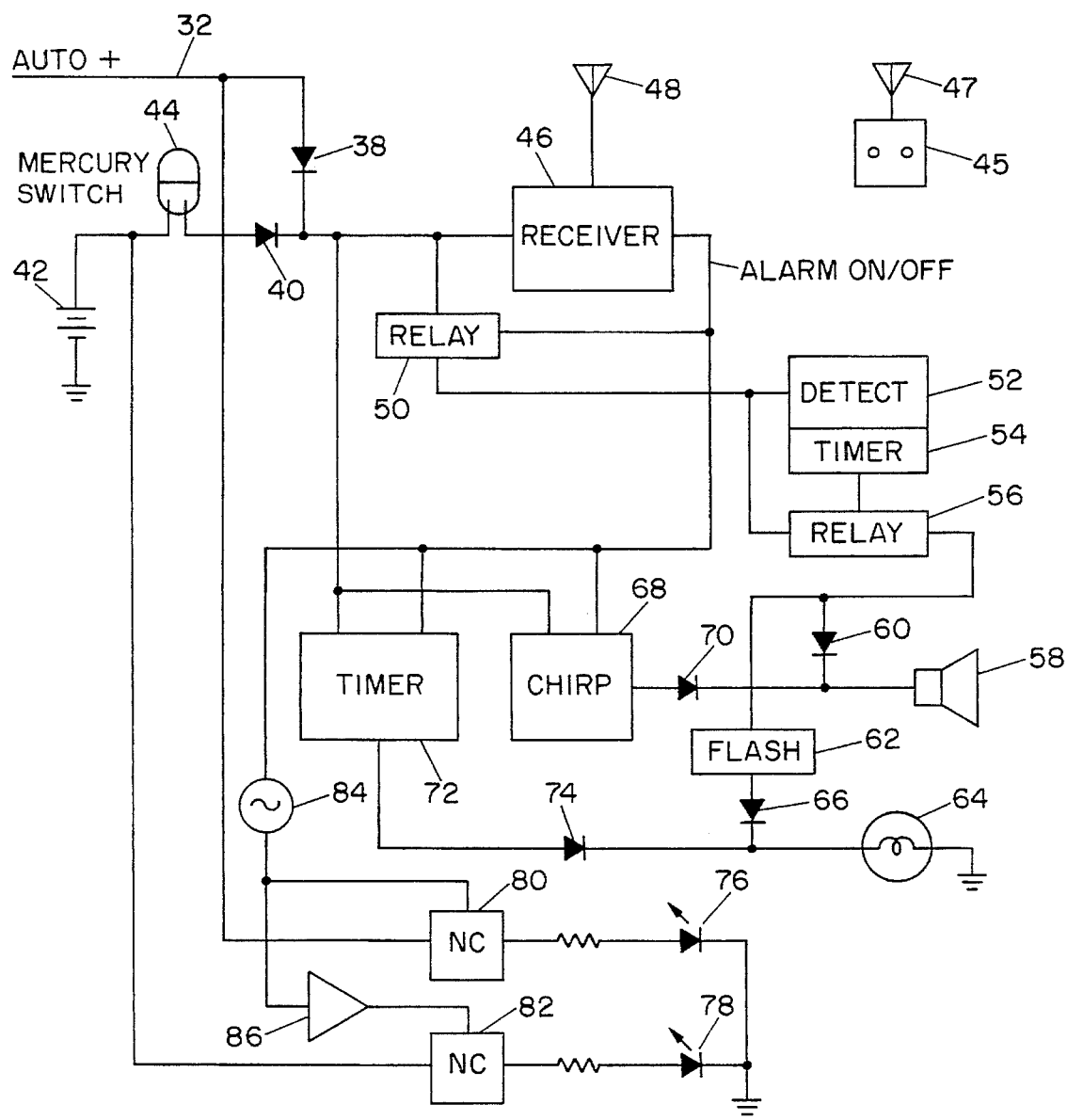
FIG. 4 is a block and schematic diagram of the alarm circuit used in an embodiment of the invention.

As shown in the circuit block diagram of FIG. 4, an auxiliary power source in the form of a 9 volt radio battery 42 is provided for the alarm circuit, to provide power for the circuit in the event an intruder disconnects the main power supply by removing plug 34 from the outlet. Diodes 38 and 40 serve to isolate the two power supplies. A mercury switch 44 is provided as a power switch for the alarm circuit. This switch provides power to the circuit from the auxiliary battery 42 when the unit is in the operative position as shown in FIG. 3, and disconnects power when the unit is inverted. Accordingly the alarm cannot be disconnected from the auxiliary power supply 42 when in the normal position of FIG. 3 and attached to a steering wheel. By using a mercury switch, the switch is entirely within the alarm case and inaccessible. An alternate arrangement is to provide a switch on the lower side of the alarm case, where it cannot be accessed when the unit is locked onto a steering wheel. Preferably, when the mercury switch is used, the bottom of the alarm case would bear a notice to store the unit in the inverted position to conserve battery life. For evident security reasons access 31 to auxiliary battery 42 should be from below the unit so that the battery cannot be removed while the unit is attached to the steering wheel.

As shown in FIG. 4, mercury switch 44 provides power to radio receiver 46, which includes antenna 48 and is of conventional design for use in auto alarms, and allows the alarm function to be armed and disarmed using remote transmitter 45, with antenna 47. Transmitter 45 includes "on" and "off" buttons to signal receiver 46. When receiver 46 receives the radio "on" signal, it provides an output signal that turns on relay 50 to power the detecting circuit 52 and provide power to the alarm timer 54 and relay 56. The alarm "on" signal is also provided to "chirp" circuit 68, which provides a short signal to the horn 58 through diode 70 causing a chirp noise to signal that the alarm is now armed. Detector 52 may include a variety of detectors that respond to vibration, ultrasonic intrusion detection, voltage transients or the like. When the detector is triggered, it activates timer 54, causing relay or solid-state circuit 56 to close for a selected alarm period, such as three minutes. Relay or solid-state circuit 56 provides power to sound horn 58 through diode 60 and activates flash circuit 62 to provide power to lamp 64 through diode 66. Accordingly the horn will sound and the light will flash to attract attention and to confuse an intruder attempting to tamper with the alarm. If the alarm has been triggered accidently by the owner, the alarm can be disarmed opening relay or solid-state circuit 50 using remote control device 45. The vehicle owner can normally disarm the alarm, also using remote control 45, which will open relay or solid-state circuit 50 and also provide a signal to chirp circuit 68, again providing a chirp sound, and to timer 72 which powers lamp 64 through diode 74. In this instance lamp 64 is continuously illuminated for about one minute to help the owner find his vehicle and enable visual inspection of the vehicle for intruders.

The alarm unit is advantageously provided with signal light emitting diodes (LED's) 76 and 78. LED 76 is red and is illuminated when the alarm is connected to the vehicle power. LED 78 is green and is illuminated to indicate the availability of auxiliary power from battery 42. By providing oscillator 84, normally closed switches 80 and 82, and inverter 86, LED's 76 and 78 can be caused to flash back and forth to signal that the alarm is in an armed condition.

Figure 5:
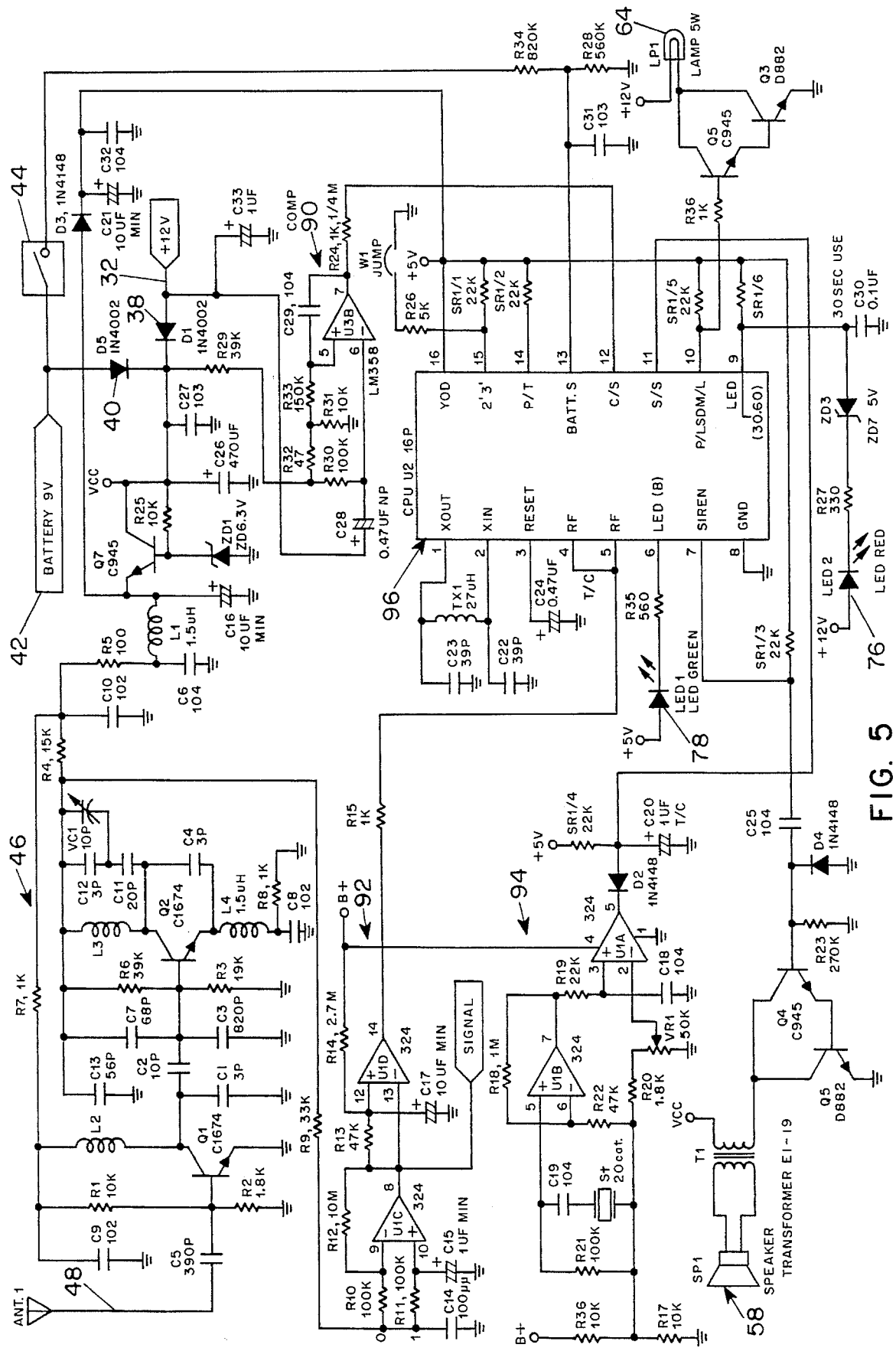
FIG. 5 is a circuit diagram for a microprocessor alarm circuit in accordance with another embodiment of the invention.

FIG. 5 is a circuit diagram implementing the alarm circuit using an existing microprocessor alarm circuit configuration with the addition of mercury switch 44. This circuit includes a comparator 90 for detecting a voltage spike in the auto power circuit to indicate an alarm, a tone decoder 92 for responding to the radio on-off codes and a clock 94 for supplying the microprocessor 96 with a clock signal. The circuit includes other elements as indicated by the same reference numerals as the FIG. 4 circuit and functions using a control program in microprocessor 96 to operate the various signaling and alarm operations.

While there have been described what are believed to be the preferred embodiments of the invention, those skilled in the art will recognize that modification may be made thereto without departing from the spirit of the invention and it is intended to claim all such modifications as fall within the scope of the invention.

I claim:

1. An anti-theft and alarm device for a vehicle, comprising:

a U-shaped rod having two ends rigidly connected to parallel lock plates, said lock plates extending perpendicular to the plane of said U-shaped rod and being spaced to receive a steering wheel of the vehicle with said U-shaped rod extending therefrom over a dash board of the vehicle;

a lock member extendable between said parallel lock plates in a position corresponding to the inside of said steering wheel whereby when said lock member is extended, said U-shaped rod is locked to said steering wheel in a position overlying said dash board; and a self-contained electronic alarm mounted between the two ends of said U-shaped rod and secured thereto, for sensing tampering with said vehicle and for signaling an alarm in response thereto.

2. An anti-theft and alarm device as specified in claim 1 wherein said alarm includes a power switch which is inaccessible for operation when said device is mounted on said steering wheel.

3. An anti-theft and alarm device as specified in claim 2 wherein said switch comprises a mercury switch.

4. An anti-theft and alarm device as specified in claim 1 wherein said alarm includes a battery power supply and a power cord for connection to the power supply of said vehicle.

5. An anti-theft and alarm device as specified in claim 4 wherein said alarm includes a back-up battery.

6. An anti-theft and alarm device as specified in claim 5 wherein access to said battery power supply is in an inaccessible position when said device is mounted to the steering wheel of the vehicle.

7. An anti-theft and alarm device as specified in claim 1 wherein said alarm includes a lamp and wherein said lamp is illuminated in response to an alarm.

8. An anti-theft device as specified in claim 7, wherein said electronic alarm includes a radio receiver for receiving command signals to arm and disarm said alarm, and wherein said lamp is illuminated when said alarm is disarmed.

9. An anti-theft device as specified in claim 7 wherein said alarm includes circuits to flash said lamp in response to an alarm.

10. An anti-theft device as specified in claim 9 wherein said electronic alarm includes a radio receiver for receiving command signals to arm and disarm said alarm circuit.

11. An anti-theft device as specified in claim 10 wherein said electronic alarm includes a switch to power said radio receiver.

12. An anti-theft device as specified in claim 11 wherein said switch is a mercury switch.

13. An anti-theft device as specified in claim 12 wherein said alarm includes at least one light emitting diode for signalling that the alarm is powered.

14. An anti-theft device as specified in claim 13, wherein said electronic alarm includes a battery power supply and a power cord for connection to the power supply of said vehicle, and wherein there are provided two light emitting diodes, one indicating said battery power supply and the other indicating connection of said vehicle power supply.

15. An anti-theft device as specified in claim 14 wherein said light emitting diodes alternatively flash when said electronic alarm is armed.

16. An anti-theft device and alarm for a vehicle, comprising:
   parallel lock plates which are spaced to receive a steering wheel of the vehicle;
   a U-shaped rod having both ends rigidly connected to the parallel lock plates, the U-shaped rod arranged to extend in a substantially perpendicular direction from said lock plates over the dash board of the vehicle;
   a lock member extendable between the parallel lock plates in a position corresponding to the inside of the steering wheel;
   a mounting plate rigidly connected between two portions of said U-shaped rod in a position corresponding to the dash board; and
   a self-contained electronic alarm mounted on the plate so a bottom of the alarm is inaccessible when the U-shaped rod is over the dash board of the vehicle.

17. An anti-theft and alarm device as specified in claim 16, wherein said alarm includes a power switch responsive to the orientation of the device.

18. An anti-theft device and alarm for a vehicle, comprising:
   first and second parallel lock plates which are spaced to receive a rim of a steering wheel of the vehicle;
   a sleeve formed on the first parallel lock plate in a position corresponding to the inside of the rim of the steering wheel;
   a lock member mounted in the sleeve and having a projecting rod extendable between the parallel lock plates for firmly securing the parallel lock plates to the rim of the steering wheel;
   a U-shaped rod having both ends rigidly connected to the parallel lock plates, the closed portion of the U-shaped rod arranged to extend from the parallel lock plates over a dash board of the vehicle;
   a plate rigidly connected between portions of the U-shaped rod extending over the dash board; and
   a self-contained electronic alarm which is mounted on the plate so a bottom of the alarm is inaccessible when the U-shaped rod is over the dash board of the vehicle, the alarm comprising:
   a power switch,
   a back-up battery power supply,
   a power cord for connection to a power supply of the vehicle,
   a radio receiver,
   an alarm circuit,
   a sounding device,
   a high intensity lamp, and
   one or more light emitting diodes.

* * * * *